Feb. 26, 1929.　　　　　　　　　　　　　　　　　　　1,703,655
W. C. BEEKLEY ET AL
HEAT EXCHANGER FOR RECOVERING HEAT FROM WASTE PROCESS WATER
Filed Nov. 19, 1925　　　2 Sheets-Sheet 1
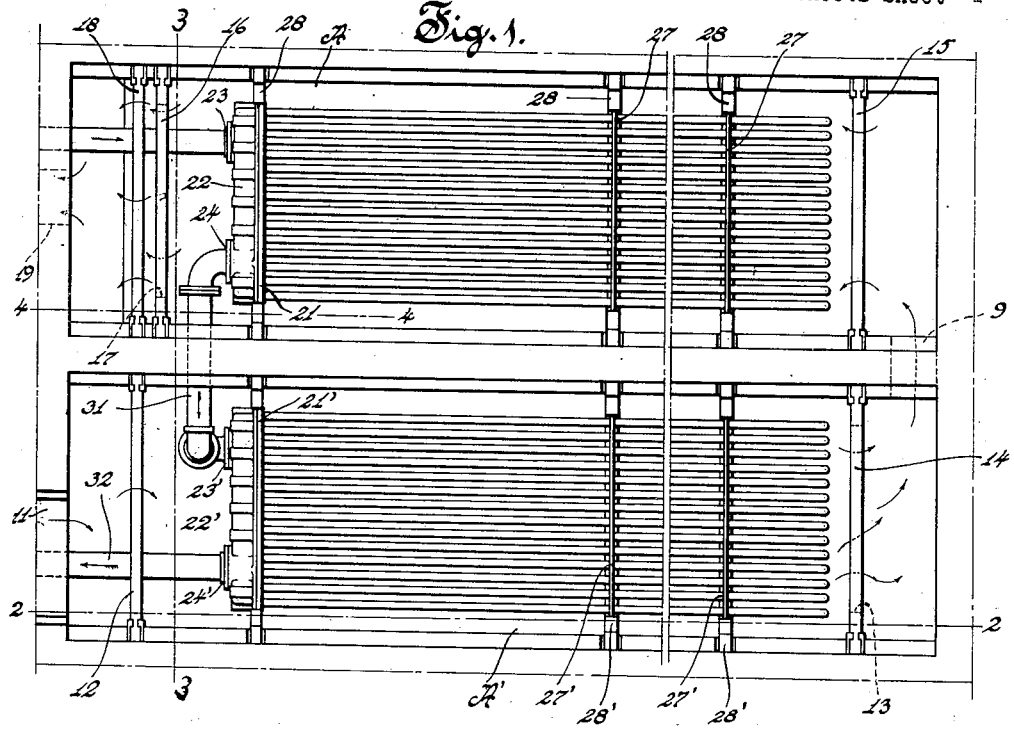
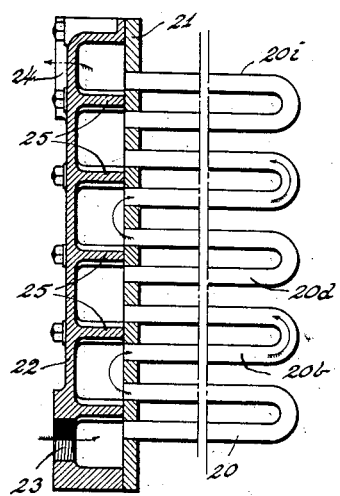
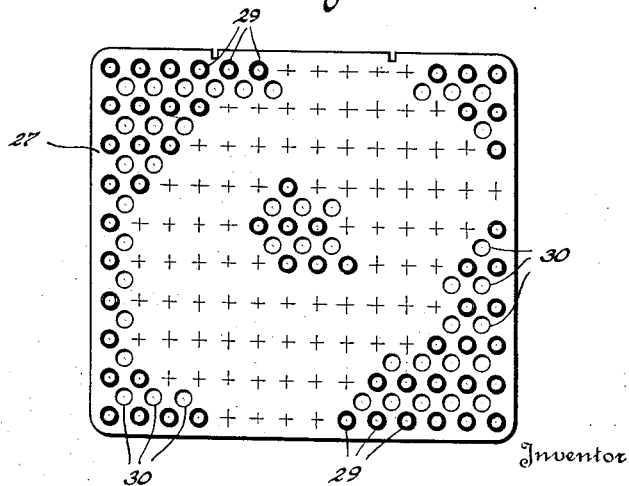
Inventor
Waldron C. Beekley
Alfred D. Martens
By T. Clay Lindsey
Their Attorney

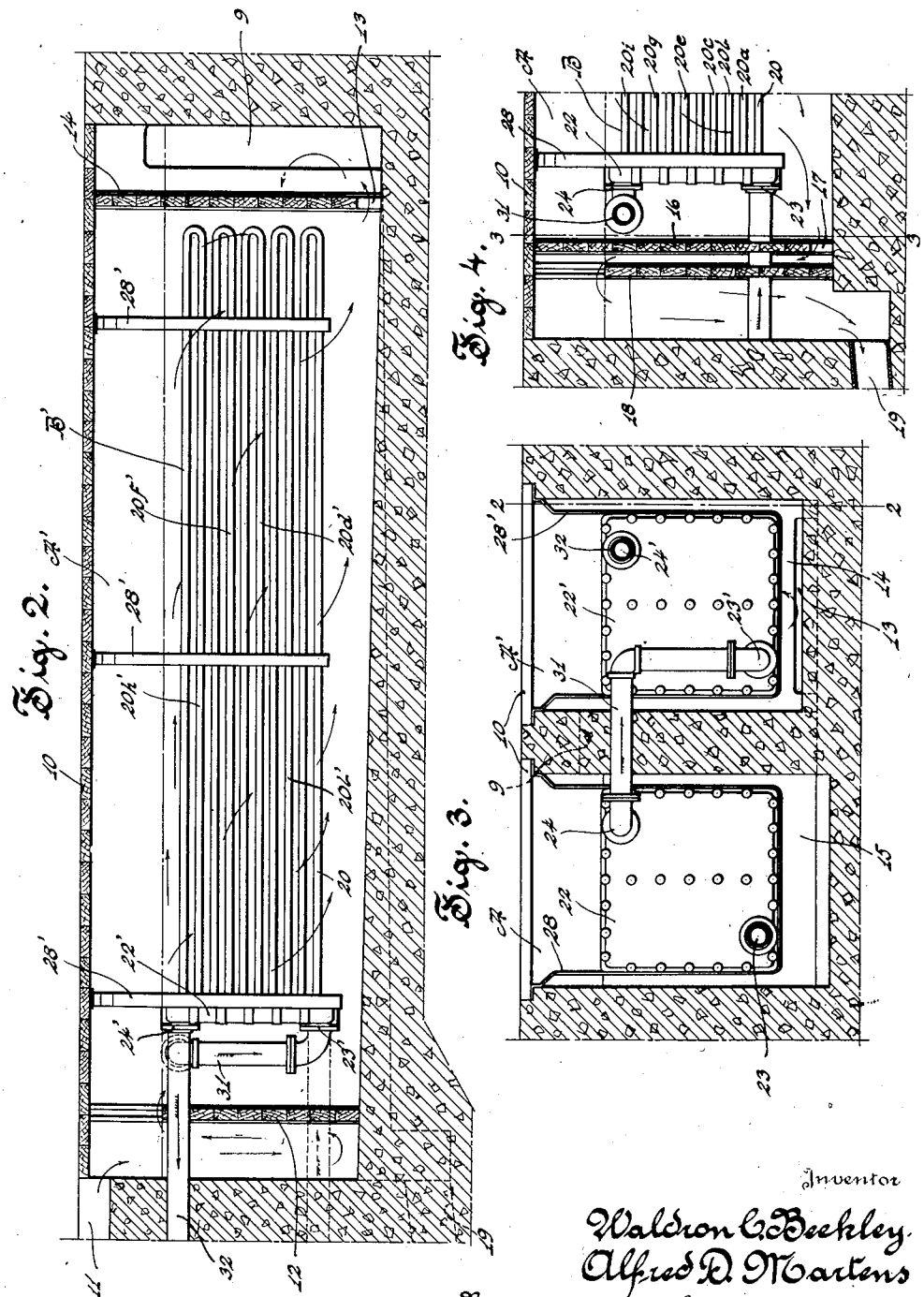

Patented Feb. 26, 1929.

1,703,655

UNITED STATES PATENT OFFICE.

WALDRON C. BEEKLEY, OF WEST HARTFORD, AND ALFRED D. MARTENS, OF HARTFORD, CONNECTICUT, ASSIGNORS TO THE WHITLOCK COIL PIPE COMPANY, OF WEST HARTFORD, CONNECTICUT, A CORPORATION OF CONNECTICUT.

HEAT EXCHANGER FOR RECOVERING HEAT FROM WASTE PROCESS WATER.

Application filed November 19, 1925. Serial No. 70,042.

In many of the industries, it is necessary to use hot water which, during the process into which it enters, becomes dirty, soapy or otherwise contaminated with grease or other foreign matters. For example, in laundries and textile mills hot water is employed for washing the fabrics or yarns and this water issues from the cleansing apparatus in a soapy and dirty condition. Heretofore it has been the practice to discharge this waste water directly to the sewer, although it still contained many valuable heat units which were thus needlessly wasted.

It has been proposed to recover this heat of the waste water by passing the same through standard types of preheaters through which is also passed the incoming cold water which may be subsequently heated to the desired temperature and then delivered to the cleaning apparatus. These attempts, however, have not proved satisfactory because of the many inherent difficulties presented, among which may be mentioned that of avoiding clogging up, and impairment of the efficiency of the preheater by the collection of grease, soap and other foreign matter on the heat exchange surfaces.

It may be here stated that a preferred arrangement for a preheater is one in which there is a direct counterflow of the mediums as, for instance, where one medium such as the medium to be heated passes through a pipe and the other medium, the heat of which is to be transferred to the cooler medium, passes in the opposite direction through a thin annular space about said pipe. Said arrangement, however, is not practical where one of the mediums is dirty or greasy because of the collection of the foreign matter on the heat transfer surfaces and the impossibility of cleaning the surfaces after they become dirty. It further may be stated that to obtain a high degree of efficiency in a preheater it is desirable to cross the temperatures, that is to say the arrangement should be such that the temperature of the water to be heated as it issues from the preheater is considerably higher than the temperature of the waste water discharged from the preheater.

The aim of the present invention is to provide an efficient, practical, simple and economical preheater or heat exchanger, particularly adapted for use in the recovery of the heat units present in soapy, greasy, dirty waste water which has been used in connection with work in laundries, textile mills, and other industrial plants.

Our improved arrangement is such that we obtain, at least in effect, a partial counterflow of the waste water and of water to be heated so that the temperature of the water to be heated as it issues from the pre-heater is considerably higher than the temperature of waste water discharged from the preheater insuring a high degree of efficiency in the apparatus while at the same time the elements are so arranged that the efficiency of the apparatus is not quickly or greatly impaired by the foreign matter and the heat exchange surfaces may be easily and quickly cleaned whenever found necessary. In order to insure that the temperature of the water to be heated as it issues from the pre-heater is considerably higher than the temperature of the waste water discharged from the pre-heater and to avoid the transfer of heat in the wrong direction at any place in the apparatus, that is to say, a flow of heat from the clean water to the waste water, the apparatus is arranged in stages.

The invention accordingly consists in the features of construction, the combination of elements, and arrangement of parts which will be exemplified in the construction hereinafter set forth and the scope of the application of which will be indicated in the appended claims.

In the drawings forming a part of this specification, and in which similar reference characters refer to similar parts:

Fig. 1 is a top plan view showing one of the many arrangements which the present invention may take;

Fig. 2 is a longitudinal vertical section therethrough taken substantially on line 2—2 of Figs. 1 and 3;

Fig. 3 is a transverse vertical section taken substantially on line 3—3 of Figs. 1 and 4;

Fig. 4 is a partial sectional view taken substantially on line 4—4 of Fig. 1;

Fig. 5 is a detail view of one of the heating units, the header thereof being in vertical section, and Fig. 6 is a face view of one of the tube supports.

In these drawings we have shown our improved apparatus as having two stages, arranged in series, but it is to be understood that the installation may have more than two stages, the number of stages depending of course upon the requirements of the plant in which the installation is to be used. Each stage includes a chamber in which is positioned a heating unit, the arrangement of each unit being such that the water to be heated will flow through the tubes thereof in a series of passes back and forth and generally from the bottom of the chamber to the top thereof, the waste water being admitted at the top of one end of each chamber and being discharged from the bottom of each chamber at the opposite end. The water to be heated passes from the top of the heating unit of the first stage to the bottom of the heating unit of the succeeding stage and the waste water passes from the bottom of one stage to the top of the next succeeding stage, as will now be described more in detail. The flow of the waste water is indicated by unfeathered arrows. In the drawings, the stages are shown as being positioned side by side but obviously they may be placed end to end or any other suitable arrangement may be adopted.

Referring to the drawings more in detail, A designates the chamber of one stage and A' the chamber of the second stage. These two chambers are located in vats or tanks which are in communication through a passage 9 shown at the right hand end of Figures 1 and 2. By preference, particularly where our improved preheater is to be installed in the ground floor of a laundry or a textile mill, for instance, these tanks may be in the form of pits or trenches, the bottoms of which are somewhat above the level of the sewer into which the waste water, after passing through the preheater, is discharged. Preferably the pits are covered over by boards or planks 10 which may be readily taken up so that access may be conveniently had to the heating units when it is desired to clean the same or for any other purpose. The waste water, which may be from a laundry machine or other apparatus, may flow through a trench or gutter 11 into the upper left hand end of the tank having the chamber A' and over the top of a dam 12. The waste water, part of the heat of which has been extracted by the clear water passing through the second stage heating unit, flows through a passage 13 at the bottom and right hand end of the chamber A', as shown in Fig. 2. This passage 13 is provided by an underflow dam 14. The waste water passes from the second stage through the passage or opening 9 to the first one, and flows over a dam 15, then through the chamber A, and then beneath an underflow dam 16, at the left hand of the chamber A. The passage below this dam is indicated by the numeral 17. To the discharge side of the underflow dam 16 is an overflow dam 18 which serves the purpose of maintaining a proper level in the first stage or chamber A. The overflow dam 15 maintains the proper level in the second stage or chamber A'. After passing over the final overflow dam 18 the waste water, all the available heat units of which have been extracted, may flow through a drainage duct 19 to the sewer.

In the present illustrative disclosure of our invention, each of the heating units is of the type having groups of tubes arranged one above the other and so connected together that the clear fresh water to be heated will flow successively through the groups of tubes and in opposite directions in adjacent groups; that is to say, the cold water will flow through the lowermost groups of tubes in one direction, then through the next level of tubes in the opposite direction, then through the next higher group of tubes in the original direction and so on until the top group is reached. In the present instance, each heating unit is shown as composed of a header and a series of U tubes connected thereto, but it is to be understood that this arrangement is shown by way of illustration only.

The heating units are similar in construction and arrangement, and therefore a description of one is illustrative of the other or others. Those parts of the unit B' within the chamber A' corresponding to the parts of the other unit B will bear corresponding reference numerals, primed. The unit B of the first stage has a series of pipes, 20, $20^a$, $20^b$, $20^c$, etc., arranged in groups one above the other. The header includes a tube sheet 21 in which the ends of the tubes 20, $20^a$, etc. are expanded. The header also includes a head 22 provided with an inlet 23 and an outlet 24, the inlet being at one of the lower corners of the header and the outlet being at the diagonally opposite corner. The head also has partitions 25 so arranged that the header is divided into chambers, and communicating with each chamber are two groups of tubes. With this arrangement the water to be heated will flow through the unit as illustrated by the feathered arrows of Fig. 5. The tubes may be supported in any suitable manner as, for instance, by means of plates 27 carried by suitable straps 28. These plates or sheets have openings 29 through which the tubes extend, and unobstructed openings 30 through which the waste water may flow. The partially heated water, which flows from the first unit through the outlet 24, is delivered by a pipe 31 to the inlet 23' of the second unit B', and will flow through the successive groups of tubes $20^{a'}$, $20^{b'}$, etc. The water may flow from the last heating unit through the outlet 24' and the pipe 32 to a storage heater (not shown) where the water may be further heated preparatory to its use in the washing or other operation to which it is to be placed.

It will be seen from the foregoing description, taken in connection with the accompanying drawings, that in operation the waste water, from which the heat is to be extracted, is passed through the successive stages, the waste water entering the top of the chamber at one end and leaving the bottom of the chamber at the other end in each stage. What, in effect, takes place is that as the waste water has its heat gradually extracted by the water passing through the tubes, it gradually sinks towards the bottom so that in effect there is a downflow of the waste water and also a longitudinal flow from the inlet end to the outlet end of each chamber. As the clear water to be heated is admitted to the bottom of the unit and flows in a series of passes back and forth towards the top of the unit there is a modified counterflow between the two mediums. The cold water passes through the first stage A and then through the second stage whereas the waste water flows in the opposite direction.

The term "chamber" is herein employed to define that unobstructed space within which the heating unit is positioned; for instance, the chamber A is that unobstructed space between the dams 15 and 16, and the chamber A' is that unobstructed space between the dams 12 and 14. The members 27 are tube supports only, they being provided with a multiplicity of holes so as not to obstruct or interfere with the gradual downward flow or sinking of the medium to the bottom of the chamber as the medium cools. These members 27 are not intended to act as, and do not perform the functions of baffles.

It has been found of advantage to make the structure in a plurality of stages as by so doing the efficiency of the apparatus is materially increased for the reason that the modified counterflow of the mediums may be more nicely controlled without the introduction of any eddies or cold currents which would impair the efficiency of the device in that where cold currents or waste water comes into engagement with the tube through which warmer, clear water is passing, the transfer of heat would be in the wrong direction. Also other advantages are obtained, including those which are attendant upon a relatively high velocity of the waste water as it passes through the chamber or pits.

It will further be noted that our improved apparatus is very simple in construction and arrangement, and economical in manufacture. It is capable of being readily cleaned since the pits are open when the planks 10 are removed, and the tubes 20, 20ª and 20ᵇ are vertically one above the other, permitting of a brush and hose to be inserted between the pipes. The use of baffles or the like may be entirely eliminated.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

We claim as our invention:

1. In a heat exchanger of the character described, a heating unit having a series of passes one above the other and through which the medium to be treated consecutively flows in a generally upward direction, and a chamber in which said unit is positioned and having an inlet at one end discharging to the entire width of said chamber and an outlet at the other end through which the entire width of the chamber discharges, said inlet being positioned above the level of said unit and said outlet being positioned below the level of said unit, whereby the heating medium passing through said chamber flows generally longitudinally of and downwardly across the passes throughout the width of the chamber, said chamber being substantially unobstructed except for said heating unit so that the heating medium may gradually sink to the bottom of the chamber throughout its length owing to stratification by gravity and pass out of the chamber at the bottom thereof.

2. In a heat exchanger of the character described, a chamber having an inlet adjacent its top and at one end and an outlet adjacent its bottom and at its other end, said inlet and outlet being substantially as wide as said chamber, and a heating unit entirely within said chamber having a plurality of groups of tubes arranged in series one above the other, said unit having an inlet communicating with the lowermost group of tubes and an outlet communicating with the uppermost group of tubes, said heating unit being below said inlet and above said outlet and said chamber being unobstructed throughout its length except for said heating unit.

3. In a heat exchanger of the character described, a plurality of chambers arranged in series, and a heating unit entirely in each chamber, each of said chambers having an inlet at one end above the level of the unit and substantially as wide as said unit, each of said chambers having an outlet at its opposite end below the unit therein and substantially as wide as said unit, each of said chambers being unobstructed throughout its length except for the heating unit therein, each of said units having a plurality of longitudinally extending tubes arranged in groups one above the other and connected in series, each of said units having an inlet communicating with the lowermost group of tubes and an outlet communicating with the uppermost group of tubes and a connection between the outlet of one unit and the inlet of the succeeding unit.

4. In a heat exchanger for recovering heat from waste process water, a heating unit having a series of passes one above the other and through which the liquid to be treated flows from a lower to an upper level, said unit having an inlet leading to the bottom thereof and an outlet leading from the top thereof, a chamber in which said unit is positioned and having an inlet adjacent the upper level of said unit and an outlet adjacent the lower level of said unit, and means at the outlet end of said chamber for maintaining the level of liquid therein above said unit, said inlet and outlet of said chamber being spaced apart longitudinally of said heating unit and said chamber being substantially unobstructed, except for said heating unit, whereby the waste process water passing through the chamber flows generally longitudinally and downwardly.

5. In a heat exchanger for recovering heat from waste process water, a plurality of chambers arranged in series and a plurality of heating units one entirely in each chamber, each of said chambers having an inlet adjacent its top and an outlet adjacent its bottom, means at the outlet end of each chamber for maintaining the level of the water above said unit therein, each of said units having a series of passes one above the other and through which the liquid to be heated flows from a lower to an upper level, each of said units having an inlet leading to the lower end thereof and an outlet leading from the top thereof, and a connection between the outlet of one unit and the inlet of the succeeding unit, said inlet and outlet of each of said chambers being spaced apart longitudinally of the heating unit therein and each of said chambers being substantially unobstructed except for said heating unit therein whereby the waste process water passing through the chambers flows generally longitudinally and downwardly.

WALDRON C. BEEKLEY.
ALFRED D. MARTENS.